United States Patent [19]

Creel, Jr. et al.

[11] 4,363,237
[45] Dec. 14, 1982

[54] SOUND SHIELD

[75] Inventors: Theodore R. Creel, Jr., Yorktown; Ivan E. Beckwith, Glouscester Point, both of Va.

[73] Assignee: The United States of America as represented by the Administrator of the National Aeronautics and Space Administration, Washington, D.C.

[21] Appl. No.: 267,935

[22] Filed: May 28, 1981

[51] Int. Cl.³ .............................................. G01M 9/00
[52] U.S. Cl. .................................................... 73/147
[58] Field of Search ........................................... 73/147

[56] References Cited

U.S. PATENT DOCUMENTS

| | | | |
|---|---|---|---|
| 3,027,760 | 4/1962 | Holderer | 73/147 |
| 3,602,920 | 9/1971 | Davis | 73/147 |
| 3,853,003 | 12/1974 | Sorensen | 73/147 |
| 3,952,590 | 4/1976 | Howard | 73/147 |

FOREIGN PATENT DOCUMENTS 1575406  9/1980  United Kingdom ................. 73/147

Primary Examiner—S. Clement Swisher
Attorney, Agent, or Firm—Wallace J. Nelson; John R. Manning

[57] ABSTRACT

An improved test section 16 for a supersonic or hypersonic wind tunnel 10 is disclosed wherein the model tested is shielded from the noise normally radiated by the turbulent tunnel wall boundary layer. A vacuum plenum 23 surrounds spaced rod elements 28 making up test chamber 16 to extract some of the boundary layer as formed along the rod elements during a test to thereby delay the tendency of the rod boundary layers to become turbulent. Novel rod construction involves bending each rod slightly prior to machining the bent area to provide a flat segment 29 on each rod for connection with the flat entrance fairing 31. Rods 28 and fairing 31 are secured to provide a test chamber incline on the order of 1° outward from the noise shield centerline to produce up to a 65% reduction of the root-mean-square (rms) pressure over previously employed wind tunnel test sections at equivalent Reynolds numbers.

5 Claims, 5 Drawing Figures

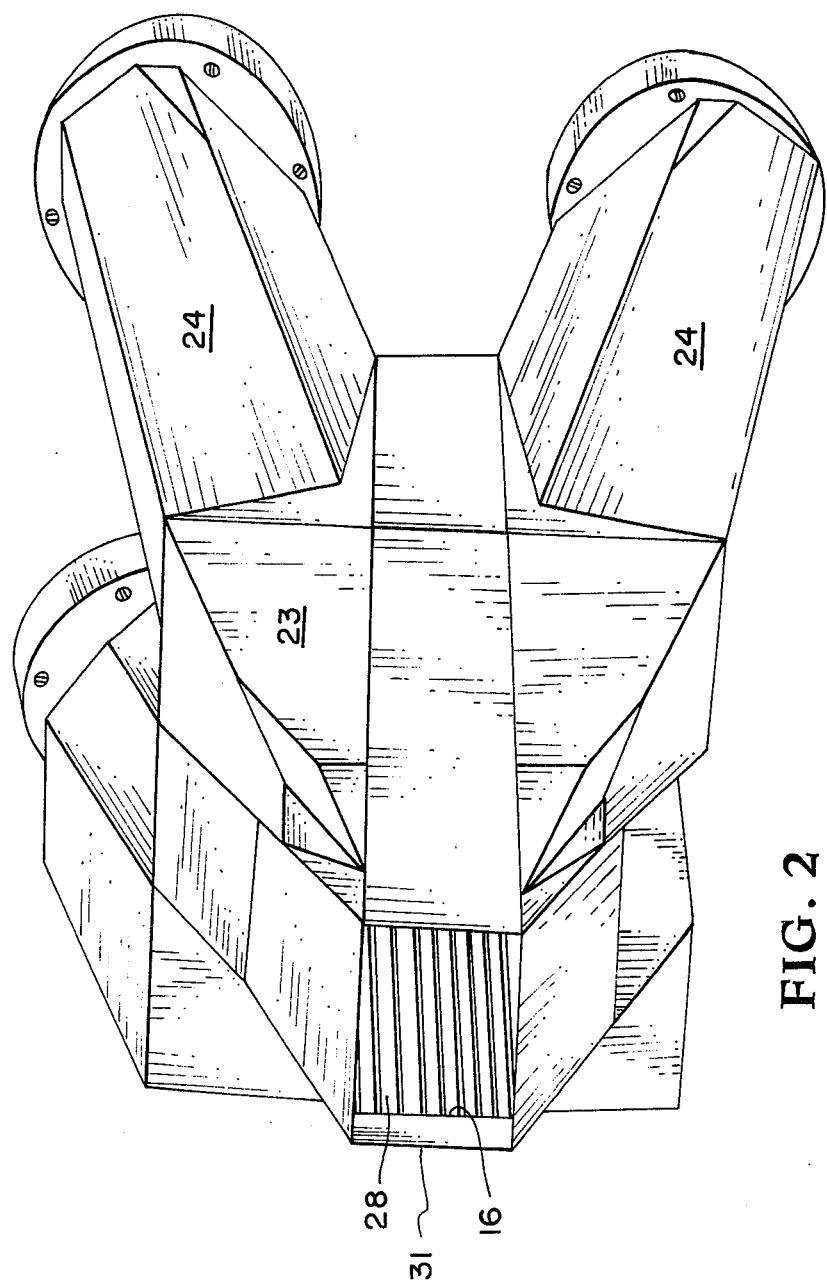

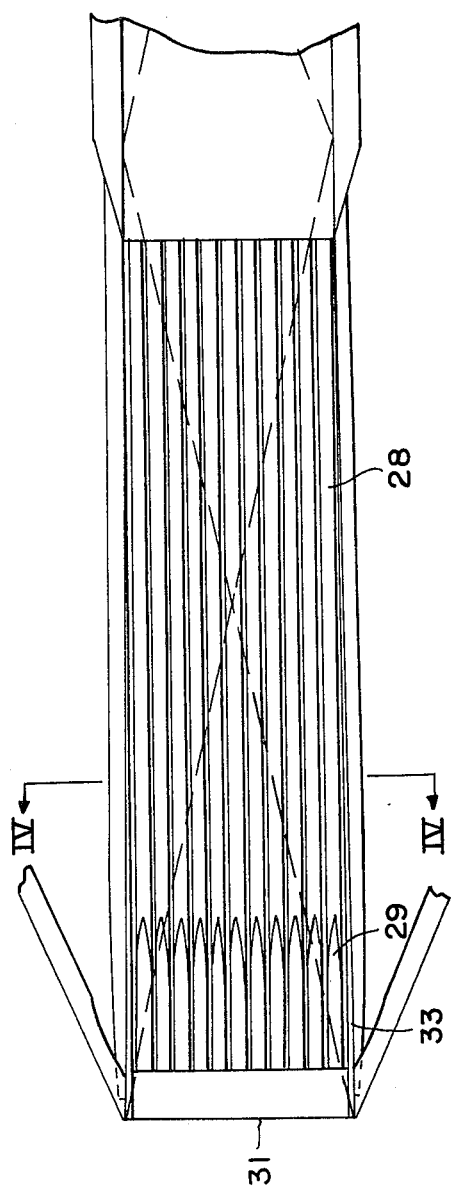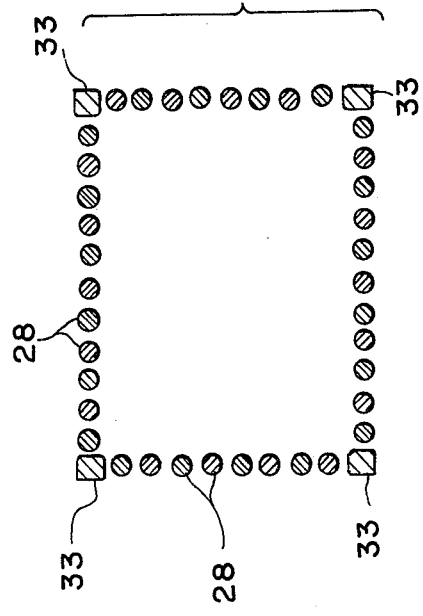

SOUND SHIELD

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

Supersonic and hypersonic wind tunnels presently used for ground testing of aircraft concepts are limited in their usefulness for purposes of studying boundary layer stability and transition by premature transition of the model boundary layer. This boundary layer transition is caused by noise or pressure fluctuations radiating from the turbulent boundary layer on the tunnel wall and impinging upon the model. There are two basic methods of preventing or reducing the radiated noise. First, because it is the turbulent boundary layer that radiates noise versus a laminar boundary layer that does not radiate noise, a laminar boundary layer on the tunnel wall is desired. This can be accomplished by various techniques, one of which consists of using longitudinal rods for the nozzle walls so that suction can be applied to the boundary layer thus maintaining a laminar boundary layer and is more fully described in NASA TMX-2566 published July 1972.

The second method of reducing the radiated noise is by shielding the model from the turbulent tunnel wall boundary layer. The present invention is directed to a system employing this method.

It is therefore an object of the present invention to provide an improved wind tunnel system for testing models subjected to supersonic and hypersonic fluid flow.

Another object of the present invention is an improved test section for a supersonic or hypersonic wind tunnel wherein the model tested is shielded from the noise radiated by the turbulent tunnel wall boundary layer.

Another object of the present invention is to provide a vacuum chamber in fluid communication with and surrounding the test chamber of a wind tunnel to remove some of the boundary layer from the test chamber as formed and thereby help maintain laminar tunnel wall boundary layers.

Another object of the present invention is to provide a test facility that shields the test model from noise radiated by the turbulent tunnel wall boundary layers in a supersonic or hypersonic wind tunnel.

According to the present invention, the foregoing and additional objects are obtained in the present invention by providing a slightly tapered rectangular test chamber in a supersonic or hypersonic wind tunnel wherein the test chamber walls are formed of spaced rod elements and surrounded by a vacuum chamber. The vacuum chamber provides a vacuum source to extract some of the boundary layer formed along the rod elements within the test chamber through the space between the rods and thereby delay the tendency of the rod boundary layers to become turbulent.

BRIEF DESCRIPTION OF THE DRAWINGS

A more complete appreciation of the invention and many of the attendant advantages thereof will become more clearly apparent as the same becomes better understood by reference to the following description when considered in connection with the accompanying drawings, wherein:

FIG. 2 is a pictorial view of the novel test chamber and accompanying vacuum chamber and conduits employed in the wind tunnel shown in FIG. 1;

FIG. 3 is a top plan view showing the interior of the novel test chamber for the wind tunnel shown in FIG. 1;

FIG. 4 is a sectional view of the test chamber as taken along the line IV—IV of FIG. 3.

DETAILED DESCRIPTION OF THE INVENTION

Figure 1:
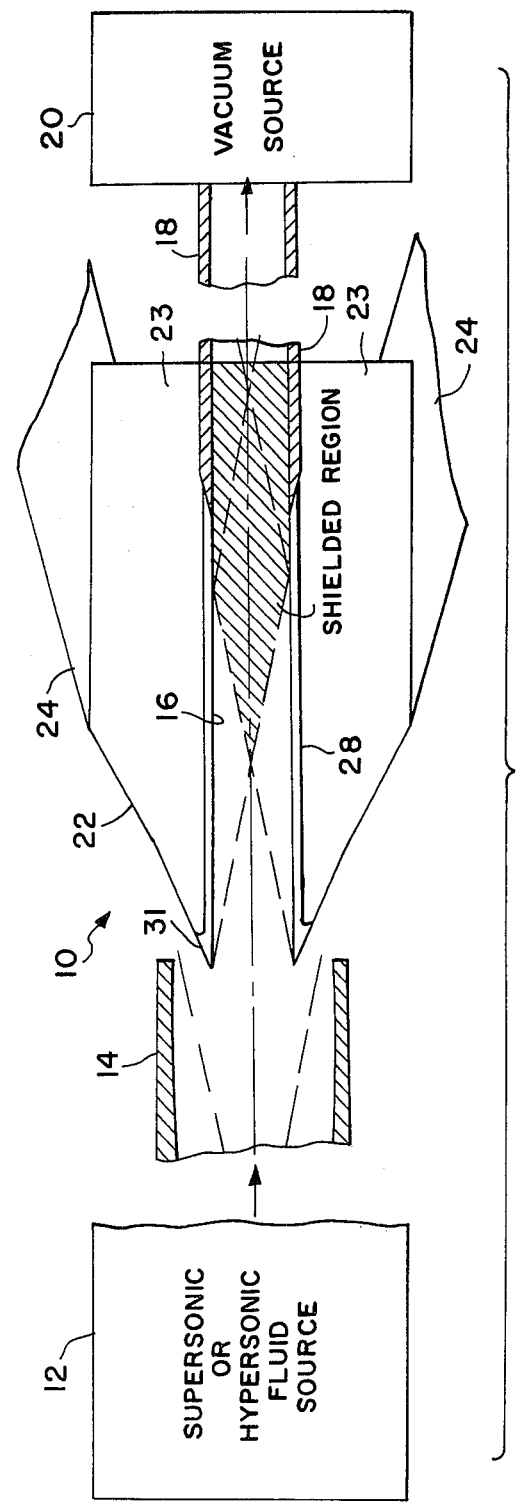
FIG. 1 is a part schematic, part sectional view of a supersonic or hypersonic wind tunnel utilizing the improved test chamber of the present invention.

Referring now to the drawings and more particularly to FIG. 1, there is shown portions of a wind tunnel generally designated by reference numeral 10 and including a conventional baffled entrance 12 in fluid connection with a stilling chamber (not shown) and exiting into a supersonic or hypersonic nozzle 14 directed at a test chamber 16. The exit 18 from test chamber 16 is in fluid connection with a vacuum source 20 capable of pulling supersonic or hypersonic fluid flow through the wind tunnel 10. In the specific embodiment described herein, vacuum source 20 consists of an evacuated sphere of approximately 18.3 meters diameter.

Test chamber section 16 of wind tunnel 10 is of rectangular configuration and is surrounded by an essentially rectangular sound shield 22 which incorporates a vacuum plenum 23. Four individual ducts or conduits 24 (only two of which are partially visible in FIG. 1) serve to provide fluid connection between plenum 23 and a second vacuum source (not shown). The interior of test chamber 16 is of substantially rectangular configuration and formed of a plurality (eleven on each "wide" side and eight on the "narrow" side in one specific embodiment) of spaced rod members 28 each of which is attached at one end thereof to a rectangular configured leading edge fairing 31 forming a rectangular configured entrance to test chamber 16.

The other end of each rod element 28 is attached to exit section 18. The corners of test chamber 16 are formed of four individual rods 33 (FIG. 4) having internally disposed rounded sectional surfaces while the interiorly disposed surfaces of each rod element 28 is circular except near the leading edge fairing end where a portion 29 of the rods is essentially flat in section as shown more particularly in FIGS. 3 and 5.

Figure 5:
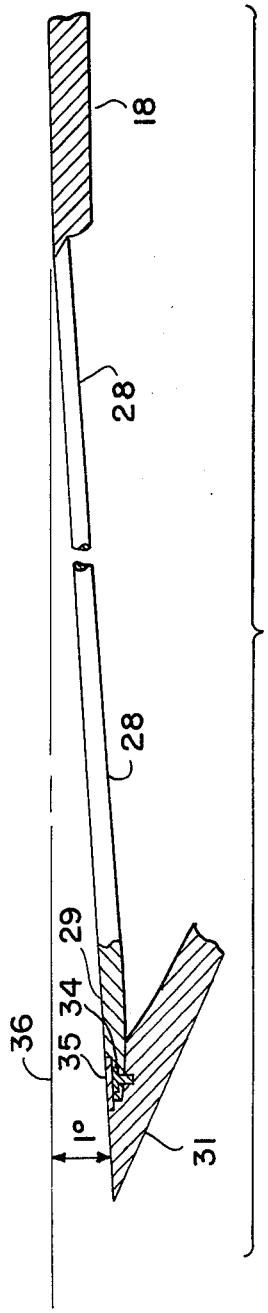
FIG. 5 is a part schematic showing of an individual rod member making up the test chamber, illustrating the angular relationship of the rods forming the test chamber structural connection thereof to the leading edge fairing and the trailing edge exit part, of the wind tunnel.

As shown more particularly in FIG. 5, the individual rods 28 are first bent to provide a small curvature along a portion of the front end thereof with this tip or curvature section being machined to provide a flat surface 29 along this bent area as shown more particularly in FIG. 3. The thus produced flat end of each individual rod 28 is secured to the flat area of leading edge 31 by a small machine screw 34. In order to achieve a flat smooth surface leading from the sharp flat leading edge 31 to the flat surface portion 29 of rods 28, a flat smooth stainless steel surface plate 35 is bonded over screw 34 by a conventional adhesive. The merged resulting surfaces (31, 35, 29 and 28) is then machined to assure a smooth flat entrance area to test chamber 16. Rods 28 are joined to exit 18 in a conventional manner to provide an interior for test chamber 16 free from protrubances.

The individual rods 28 are angularly displaced 1° to 2° relative to the centerline of test chamber 16 so as to provide a chamber of reducing sectional area from entrance to the end of the rods where they join the exit 18 as indicated in FIG. 5 by reference line 36 which is parallel to the centerline of test chamber 16.

Referring to FIG. 3, a schematic representation of the sidewall shock generated in a supersonic or hypersonic test is shown as it would appear looking at either of the walls of test chamber 16 as indicated by the broken lines. As shown therein, this sidewall shock pattern defines a diamond-shaped region or shielded region that defines the desired area for positioning a model to be tested. The present invention provides for suction of some of the boundary layer flow on the rods through the chamber walls via the spacing between rods 28 and under the influence of the vacuum pressure in plenum 23 and thereby maintain laminar flow along the test chamber walls.

In a specific embodiment of the invention, test chamber 16 was formed of 0.64 cm diameter rods with 0.102 cm gaps between each rod and eleven rods of 32.5 cm length forming the top and bottom walls of the test chamber and eight identical spaced rods forming each of the two side walls. The test chamber was designed so that the surface of the sharp flat leading edge fairing 31 was inclined 1° outward from the shield centerline at the same angle as the individual rods 28. This test chamber configuration thus presents a slight taper from an enlarged entrance to a smaller exit area. This 1°-2° inclined leading edge configuration is in contrast to previous shield models wherein sharp leading edges were also used but the leading edges thereof were inclined up to 2° inward toward the shield centerline. The present invention has shown up to a 65% reduction of the root-mean-square (rms) pressure in the entire shielded region when tested at Mach 5 over a range of unit Reynolds number of $0.5 \times 10^7$ to $2.0 \times 10^7$ per meter.

In the Mach 5 tests, static pressure measurements in the nozzle, the test chamber, the model vacuum plenum, and on the rods showed that the flow in the shield was fully started over the range of test conditions. These data also showed that the inviscid cross flow in the gaps was sonic except near the leading edge at the lowest Reynolds number where the cross flow was subsonic. The suction mass flow in this region was presumably reduced below desired values.

Surveys of mean pitot pressure within the shielded region inside the model showed that the leading edge shocks were strong, but no centerline focusing effects as has occurred in previous tests of a axisymmetric rod-wall shield were present. Leading edge shocks (sidewall and bottom) were observed to move downstream slightly with increasing Reynolds number. A reasonably uniform flow core was found in the shielded region of the present model. This core was about 16 cm long by 2.5 cm square in cross-section.

Transition in the rod boundary layers was obtained from surface pitot pressure surveys along the windward ray of the rods. The noise field in the model was measured with fluctuating pitot pressure probes utilizing piezoelectric transducers and with hot-wire probes. The hot-wire data showed that the dominant disturbance mode was acoustic.

At the lower Reynolds numbers and when the fluctuating pitot pressure probe "sees" mostly laminar flow on the rods, the local freestream noise levels were reduced from about 1.5 percent down to about 0.6 percent by the shield. However, the actual nozzle "input" noise as measured upstream before reflection at the shield wall was not attenuated significantly even when the rod boundary layers were laminar. When the rod boundary layers were transitional or turbulent the shield noise levels at higher Reynolds numbers were above nozzle input levels due at least partly to the increase in high frequency energy radiated from the very thin rod boundary layers.

Analysis of theory and data for reflection of noise from flat plate laminar boundary layers indicates that the lack of significant attenuation when the rod boundary layers were laminar may be attributed to the very high frequencies of the nozzle input noise. These high frequencies are unique to the rapid expansion nozzle and are not found in larger conventional nozzles.

It is thus seen that the present invention provides an improved wind tunnel test system for reducing the radiated noise normally occurring by shielding the test model from the noise radiated from the turbulent tunnel wall boundary layer. By providing the improved spaced rod test chamber and surrounding vacuum chamber, the vacuum source removes some of the boundary layer from the tunnel test wall as formed and delays the tendency of this boundary layer to become turbulent.

There are obviously many variations and modifications of the specific embodiment described herein that will be readily apparent to those skilled in the art in the light of the above teachings. It is therefore to be understood that within the scope of the appended claims, the invention may be practiced otherwise than as specifically described herein.

What is claimed as new and desired to be secured by Letters Patent of the United States is:

1. A noise shielding system for high speed transition research in supersonic and hypersonic wind tunnels provided with a source of supersonic or hypersonic fluid flow, a nozzle area through which the fluid flows, a test section for receiving the fluid flow and subjecting a test model positioned therein to the fluid flow and an exit area for the fluid flow, the improvement therewith comprising:

said test section being substantially a rectangular configuration;

a vacuum chamber surrounding each side of the test chamber and having conduits leading therefrom to a vacuum source;

a plurality of spaced individual rod elements forming the four sides of said test chamber thereby providing fluid communication between said test chamber and said vacuum chamber;

one end of each said spaced rod elements terminating and merging with a faired entrance shield portion of said vacuum chamber at the end of said test chamber receiving the fluid flow;

the other end of each said rod element terminating and merging with a rectangular passageway leading to the wind tunnel exit;

said rod elements and said entrance shield portion being slightly inclined inwardly toward the downstream end of said test chamber to provide a taper and slightly reduced cross-section dimensions to said test chamber at the exit end thereof.

2. The improved noise shielding system as in claim 1 wherein the incline of said entrance shield and said rod elements is on the order of 1°.

3. The improved noise shielding system as in claim 1 wherein the substantially rectangular configured test section is provided with internally disposed rounded corners.

4. The improved noise shielding system as in claim 1 wherein the end of each of said rod elements merging with the faired entrance shield at the end of said test chamber receiving the fluid flow is provided with a machined flat surface area along a portion of the length thereof, means attaching said flat surface area to said faired entrance shield and plate means securely positioned over said means attaching said rod flat surface area to provide a smooth surface area formed by said entrance shield, said plate means and said rod flat surface area.

5. The improved noise shielding system as in claim 4 wherein each said rod element is provided with a controlled bend along a portion of one end thereof and said machined flat surface is formed along the length of the bend to thereby provide a linear surface along the machined flat surface area and the remainder of the rod.

* * * * *